Dec. 2, 1941.                R. P. HANNA                2,265,038
                       TROLLEY CONDUCTOR DEVICE
                         Filed May 31, 1940
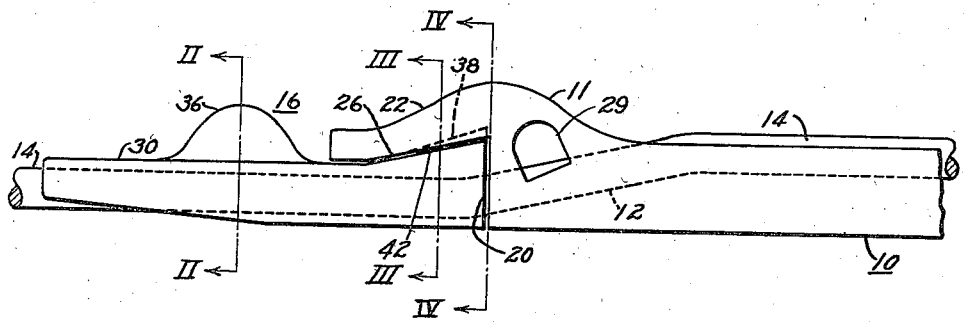
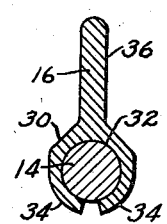 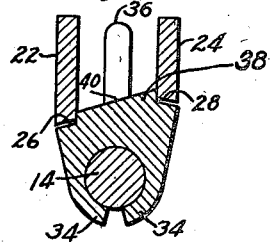
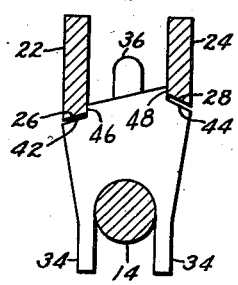 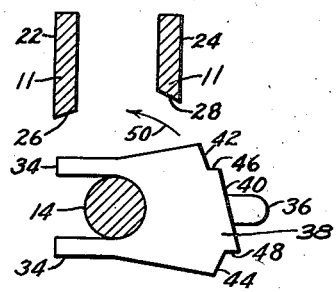
WITNESSES:                                    INVENTOR
Leon M. Garman                             Raymond P. Hanna
N. C. Groome                                  BY
                                                 Crawford
                                                   ATTORNEY

Patented Dec. 2, 1941

2,265,038

UNITED STATES PATENT OFFICE 2,265,038

TROLLEY CONDUCTOR DEVICE

Raymond P. Hanna, Pittsburgh, Pa., assignor to Westinghouse Electric & Manufacturing Company, East Pittsburgh, Pa., a corporation of Pennsylvania Application May 31, 1940, Serial No. 338,074

11 Claims. (Cl. 191—37)

My invention relates, generally, to trolley conductor devices, and it has reference, in particular, to a renewable approach member for use with trolley conductor devices of various kinds.

Generally stated, it is an object of my invention to provide a renewable approach member for a trolley conductor device that shall be simple to construct and economical to manufacture, and which may be readily attached to and be detached from a trolley conductor device.

More specifically, it is an object of my invention to provide for attaching a renewable approach member to a trolley conductor device by means of interlocking surfaces thereon which may be brought into engagement by movement of the approach member relative to the device in a direction transverse to the axis of the trolley conductor, so as to require a minimum deflection of the trolley conductor in attaching or detaching the approach member.

Another object of the invention is to provide a simple and durable renewable approach member for trolley conductor devices which may be secured thereto with a minimum amount of effort and deflection of the trolley conductor and yet provide adequate mechanical interlocking therebetween to prevent accidental detachment of the approach member.

A further object of the invention is to provide for attaching a renewable approach member to a trolley conductor device by rotating the approach member about the trolley conductor to effect an interlocking relation between portions of the approach member and the trolley conductor device.

Other objects will, in part, be obvious and will, in part, appear hereinafter.

In practicing my invention, a renewable approach member may be provided for a trolley conductor device, such as a trolley frog, crossing, or the like, which may be positioned on the trolley conductor from the side thereof, and secured in fixed longitudinal relation to the trolley conductor device by rotating it about the trolley conductor to interlock corresponding surface portions thereon, which may be maintained in engagement by means of the trolley conductor. The rotating movement of the approach member requires a minimum deflection of the trolley conductor to effect the interlocking engagement of the surfaces.

For a more complete understanding of the nature and scope of my invention, reference may be had to the following detailed description and the accompanying drawing, in which—

Figure 1 is a side elevational view of a portion of a trolley conductor device and an approach member embodying the features of my invention;

Fig. 2 is an enlarged sectional view taken along the line II—II of Fig. 1;

Fig. 3 is an enlarged sectional view taken along the line III—III of Fig. 1;

Fig. 4 is an enlarged part sectional view taken along the line IV—IV of Fig. 1 showing how the approach member is first positioned on the trolley conductor; and Fig. 5 is an enlarged sectional view of the section shown in Fig. 4 after the approach member has been rotated to interlock with the trolley conductor device.

Referring to Figs. 1, 2 and 3, the reference numeral 10 may denote generally a portion of a trolley conductor device such as, for example, a trolley frog, crossing, or the like, which may have an extended end portion 11 provided with an upwardly inclined channel 12 for receiving a trolley conductor 14. The extended end portion 11 may be integral with the body of the trolley conductor device 10, as shown, or it may, if desired, be separate therefrom and attached thereto in any suitable manner. The trolley conductor device may be further provided with a renewable approach member 16, which is disposed to take up the shocks and wear incident to the passage of a current collector on to the trolley conductor device.

The end portion 11 of the trolley conductor device 10 may be provided with suitable means for effecting the connection of the approach member 16 thereto, such as, for example, the recess 20 on the lower side of the end portion 11 adjacent the end thereof. The end portion may be slotted to provide two oppositely positioned arms 22 and 24. By extending the recess 20 higher on one side than the other, and higher at the inner end than adjacent the end of the end portion 11, the lower surface portions 26 and 28 of the arms 22 and 24, respectively, may be angularly related to the longitudinal axis of the conductor 14, being, for example, made to slope downwardly towards the end of the end portion 11, and may be generally spaced at different distances from the trolley conductor 14, for a reason which will be explained in detail hereinafter. An opening 29 may be provided in the side of the end portion 11 to facilitate depressing the trolley conductor in the channel 12.

The renewable approach member 16 may comprise an elongated body member 30 having a longitudinal groove 32 along the lower side thereof for receiving the trolley conductor 14. Depending lips 34 may be provided on each side of the groove 32, which may be pressed inwardly about the trolley conductor to secure the approach member to the conductor. With a view to providing for a smooth passage of a current collector on to the approach member 16, the depending lips 34 may be so shaped that they taper upwardly adjacent the end remote from the trolley conductor device so as to permit a gradual transition of the current collector from the trolley wire 14 on to the tapered portion of the approach device.

In order to provide for securing the approach member 16 to the trolley conductor device 10, suitable means may be provided for rotating the approach member about the trolley conductor, such as the upwardly extending ear 36 on the upper side thereof. Suitable means may be provided on the body member 30 adjacent the end nearest the trolley conductor device 10 for effecting an interlocking relation therewith. For example, means such as the projection 38 may be provided on the upper side of the body member 30 the upper surface 40 of which may slope in the longitudinal direction corresponding to the slope of the lower surface portions 26 and 28 of the extending arms 22 and 24 of the end portion 11. With a view to permitting the approach member 16 to be secured in interlocking relation with the trolley conductor device 10 with a minimum deflection of the trolley conductor 14, the upper surface 40 of the projection 38 may slope transversely also, so that it is higher at one endge than at the other, corresponding to the relative distances of the surface portions 26 and 28 of the arms 22 and 24 from the trolley conductor. Recesses may be provided along the upper edges of the projection 38 so as to define ledge portions 42 and 44 for engaging the sloping surface portions 26 and 28 of the arms 22 and 24, respectively, and substantially vertical shoulder portions 46 and 48, which are disposed to engage the inner surfaces of the arms 22 and 24.

In order to attach the renewable approach member 16 to the trolley conductor device 10, a suitable tool, such as a bar, or the like, may be inserted in the opening 29 provided in the upstanding side of the end portion 11, so as to depress the trolley conductor 14 in the channel 12. The approach member 16 may then be positioned on the trolley conductor 14 from the side, in the manner illustrated in Fig. 4, with the trolley conductor 14 in the longitudinal groove 32 and the projection 38 longitudinally positioned opposite the recess 20 of the end portion 11 of the trolley conductor device. The approach member 16 may then be rotated about the trolley conductor 14 in the counterclockwise direction as indicated by the curved arrow 50, either by hand or by applying a suitable wrench or the like to the upstanding ear 36 of the approach member.

Since the lower surface portion 26 is at a lesser radial distance from the trolley conductor 14 than the surface portion 28, and the upper surface 40 of the projection 38 at the end of the approach member has a corresponding transverse slope, the approach member 16 may be readily rotated about the trolley conductor 14 with a minimum of interference therebetween until it has been rotated substantially through 90°, when the central portion thereof between the shoulders 46 and 48 lies directly between the side arms 22 and 24 of the end portion 11. The trolley conductor 14 may then be released by withdrawing the tool from the opening 29 so that it tends to straighten out, thus forcing the projection 38 of the approach member 16 upwardly into the recess 20 to the position shown in Fig. 4, so that the central portion thereof between the shoulders 46 and 48 projects upwardly between the arms 22 and 24 to prevent any further rotation of the approach member about the conductor 14, accidentally. The depending lips 34 may then be pressed inwardly about the trolley conductor 14 to firmly secure the approach member to the trolley conductor and provide for the smooth passage of a current collector therealong. As the engaging surfaces 42 and 44 of the end projection 38 on the approach member and the corresponding surfaces 26 and 28 on the end portion 11 of the trolley conductor device slope downwardly towards the end of the end portion, and the trolley conductor effects an upward biasing force on the approach member 16, the end projection 38 is thereby firmly interlocked with the extending arms 22 and 24 of the end portion 11 to prevent longitudinal movement of the approach member 16 relative to the trolley conductor device 10, while allowing a limited movement of the approach member in the vertical direction to minimize shocks and wear incident to the passage of a current collector therealong.

To remove the approach member 16 from the trolley device 10, a suitable tool may be inserted in the opening 29, and manipulated to depress the trolley conductor 14 slightly. The approach member may then be removed by rotating it in a clockwise direction to free it from the arms 22 and 24 of the trolley device. As the lips 34 are usually substantially worn off by the time it is necessary to remove an approach member, the approach member may then be readily removed after it is freed from the trolley device.

From the above detailed description and the accompanying drawing, it will be apparent that by my invention I have provided in a simple and effective manner for attaching a renewable approach member in fixed longitudinal relation to a trolley conductor device. The attachment may be readily effected and requires only a relatively small deflection of the trolley conductor from its normal free position, thus facilitating greatly the operations of attaching the approach member to and detaching it from the trolley conductor device. Since renewable approach members must usually be attached to and detached from trolley conductor devices when the latter are in position in the overhead trolley conductor system, and the operations must usually be effected from a tower wagon or the like, and in haste so as not to interrupt the normal traffic of the electrically operated vehicles, it will be appreciated that by providing for attaching and detaching an approach member and a trolley conductor device in the manner herein disclosed, so that it may be more easily and more quickly attached, I have provided an important and valuable contribution to the art.

Since certain changes may be made in the above description, and different embodiments of the invention may be made without departing from the spirit thereof, it is intended that all the matter contained in the above description or shown in the accompanying drawing, shall be considered as illustrative and not in a limiting sense.

I claim as my invention:

1. The combination with a trolley conductor device for use with a trolley conductor, of a renewable approach member disposed to be positioned on the trolley conductor, and means including interlocking surfaces between the device and the approach member angularly related to the longitudinal axis of the conductor movable into engagement in a substantially horizontal direction transverse to the trolley conductor and maintained in engagement by the conductor to prevent longitudinal motion of the approach member relative to the trolley conductor device.

2. In combination, a trolley conductor device, and a renewable approach member adapted to be positioned on the conductor, said device having a projecting end portion with a recess on the lower side thereof having upwardly extending wall portions and disposed to receive a corresponding portion on the approach member to effect an endwise interlocking engagement with the wall portion by rotating the approach member about the axis of the trolley wire, thereby to secure the approach member to the trolley conductor device.

3. The combination with a trolley conductor device having a channel for receiving a trolley conductor, of an end portion having an upwardly extending recess on the lower side with wall portions, an approach member having a conductor receiving channel on the lower side positioned on the conductor, and a surface portion on the upper side thereof adapted to be moved into interlocking relation with a wall portion of the said recess by rotation of the approach member about the trolley conductor and maintained in said relation by the conductor to prevent longitudinal movement of the approach member along the trolley conductor, and additional means cooperative with the end portion to prevent further rotation of the approach member.

4. A trolley conductor device comprising, a body member having a channel-shaped portion with upstanding sides adapted to receive a trolley wire, said channel-shaped portion having a side opening therein for receiving a tool to depress the conductor in the channel portion and a recess on the under side thereof providing surface portions angularly related to the longitudinal axis of the conductor at different distances from the trolley conductor, a renewable approach member adapted to be positioned on the conductor having a conductor receiving groove on the under side and surface portions on the upper sides at different distances from the trolley wire adapted to engage the said corresponding surface portions of the channel-shaped portion and be retained in engagement by the conductor, and means on the approach member for rotating the approach member about the trolley conductor to bring the said surface portions into engagement.

5. A trolley conductor device comprising, a body member having a channel for receiving a trolley conductor and provided with a recess in the under side having surface portions angularly related to the longitudinal axis of the conductor extending higher on one side of the channel than on the other, a renewable approach member adapted to be positioned on the conductor having a conductor receiving groove on the under side and surface portions on the upper side adapted to interlock with corresponding surface portions of the recess to prevent longitudinal motion of the approach member along the conductor, said surface portions being higher on one side to permit engagement thereof with the surface portions of the recess from one side with a minimum displacement of the trolley conductor by rotating the approach member about the trolley conductor.

6. The combination with a trolley conductor device having a channel portion for receiving a trolley conductor and a recess in one side generally transverse to the longitudinal axis of the conductor and having a surface portion in angular relation to the longitudinal axis of the conductor, of a renewable approach member positioned on the conductor having a conductor receiving channel on the under side and a projecting portion adapted to be positioned in the recess and interfit with the surface portion of the recess, and means on the approach member for rotating the approach member about the trolley conductor to position the projecting portion in the recess to prevent movement of the approach member relative to the trolley conductor device longitudinally of the trolley conductor.

7. A trolley conductor device comprising, a body having a trolley conductor receiving channel on the upper side with an opening in the side thereof for receiving a tool to depress the trolley conductor in the channel and a recess in the lower side thereof with a surface portion angularly related to the longitudinal axis of the conductor, a renewable approach member positioned on the conductor having a conductor receiving groove on the under side and an upwardly projecting portion on the upper side adapted to be positioned in engagement with the surface portion of the recess by rotating the approach member about the trolley conductor when it is depressed in the channel of the body, means on the approach member for rotating said member about the trolley conductor, and additional means cooperative with the body member to prevent further rotation of the approach member about the conductor after the tool is withdrawn from the opening.

8. A trolley conductor device comprising, a body member having a channel on its upper side for receiving a trolley conductor and a recess in its under side adjacent one end having upwardly extending end surfaces, a renewable approach member adapted to be positioned on the conductor having a conductor receiving groove on its under side and surface portions on the upper side adjacent one end adapted to be moved into interlocking engagement with an end surface of the recess in a direction transverse to the trolley conductor and maintained therein by the conductor to prevent motion of the approach member relative to the body member along the trolley conductor, means on the approach member for rotating the approach member about the trolley conductor, and means effective to prevent accidental rotation of the approach member.

9. The combination with a trolley conductor device having a channel on the upper side adjacent one end to receive a trolley conductor and a recess adjacent said one end opening on one side with wall portions angularly related to the longitudinal axis of the conductor, of an approach member adapted to be positioned on the conductor having a groove on the lower side to receive the trolley conductor and a projecting end portion disposed to be positioned in the recess from the side upon deflection of the trolley conductor and rotation of the member thereabout to interlock with a wall portion of the recess and secure the approach member to the conductor device.

10. In combination, a trolley conductor device for use with a trolley conductor, and a renewable approach member disposed to be positioned on the trolley conductor and secured to the device, said device having a recess generally transverse to the longitudinal axis of the conductor adjacent one end with a wall portion angularly related to the longitudinal axis of the conductor to receive a corresponding end portion of the approach member from one side to interlock mechanically with said wall portion, said end portion being maintained in the recess by the trolley conductor.

11. An approach member for use with a trolley conductor device having a channel adjacent one end to receive a trolley conductor and a recess with a wall portion angularly related to the longitudinal axis of the conductor open at one side adjacent the end comprising, an elongated body member adapted to be positioned on the conductor having a groove on the lower side to receive the trolley conductor and an integral end portion corresponding to the recess of the trolley conductor device disposed to be positioned in the recess from the side to effect an interlocking engagement with a wall portion thereof and retained therein to prevent relative longitudinal movement of the approach member and trolley conductor device.

RAYMOND P. HANNA.